US008851757B2

(12) United States Patent
Serafini

(10) Patent No.: US 8,851,757 B2
(45) Date of Patent: Oct. 7, 2014

(54) BEARING UNIT FOR A VEHICLE WHEEL

(71) Applicant: Andrea Serafini, Pinerolo (IT)

(72) Inventor: Andrea Serafini, Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/748,154

(22) Filed: Jan. 23, 2013

(65) Prior Publication Data

US 2013/0188896 A1     Jul. 25, 2013

(30) Foreign Application Priority Data

Jan. 25, 2012   (IT) .............................. TO2012A00065

(51) Int. Cl.
| *F16C 33/76* | (2006.01) |
| *F16C 41/00* | (2006.01) |
| *F16C 33/72* | (2006.01) |

(52) U.S. Cl.
CPC ............. *F16C 41/007* (2013.01); *F16C 33/723* (2013.01); *F16C 33/768* (2013.01); *F16C 2326/02* (2013.01)
USPC ............................ 384/448; 384/544; 384/489

(58) Field of Classification Search
USPC ......................................... 384/544, 489, 448
See application file for complete search history.

(56) References Cited

U.S. PATENT DOCUMENTS

| 7,153,029 | B2 * | 12/2006 | Monetti et al. ................. 384/448 |
| 8,419,288 | B2 * | 4/2013 | Kaneko et al. ................. 384/477 |
| 8,585,298 | B2 * | 11/2013 | Komori et al. ................. 384/544 |
| 2005/0047693 | A1 | 3/2005 | Niebling et al. |
| 2009/0285516 | A1 | 11/2009 | Neibling et al. |
| 2011/0181101 | A1 * | 7/2011 | Sicilia et al. .................. 384/489 |
| 2011/0254356 | A1 | 10/2011 | Yamamoto et al. |

* cited by examiner

*Primary Examiner* — Thomas R. Hannon
(74) *Attorney, Agent, or Firm* — Bryan Peckjian; SKF USA Inc. Patent Department

(57) ABSTRACT

A bearing unit has an axis of rotation and a stationary ring and a rotatable ring, these rings being coaxial with each other and axially delimited on one side by respective axial surfaces which are transverse to the axis. An encoder is fixed to an outer cylindrical surface of the inner ring, and a protective cover is mounted on the outer ring to protect the encoder and to close off a space formed between the two rings. The axial surface of the outer ring and the protective cover jointly delimit a compartment for housing the encoder that is positioned substantially outside the space and that extends radially from the outer cylindrical surface to a boundary in the proximity of an outer cylindrical surface of the outer ring.

9 Claims, 1 Drawing Sheet

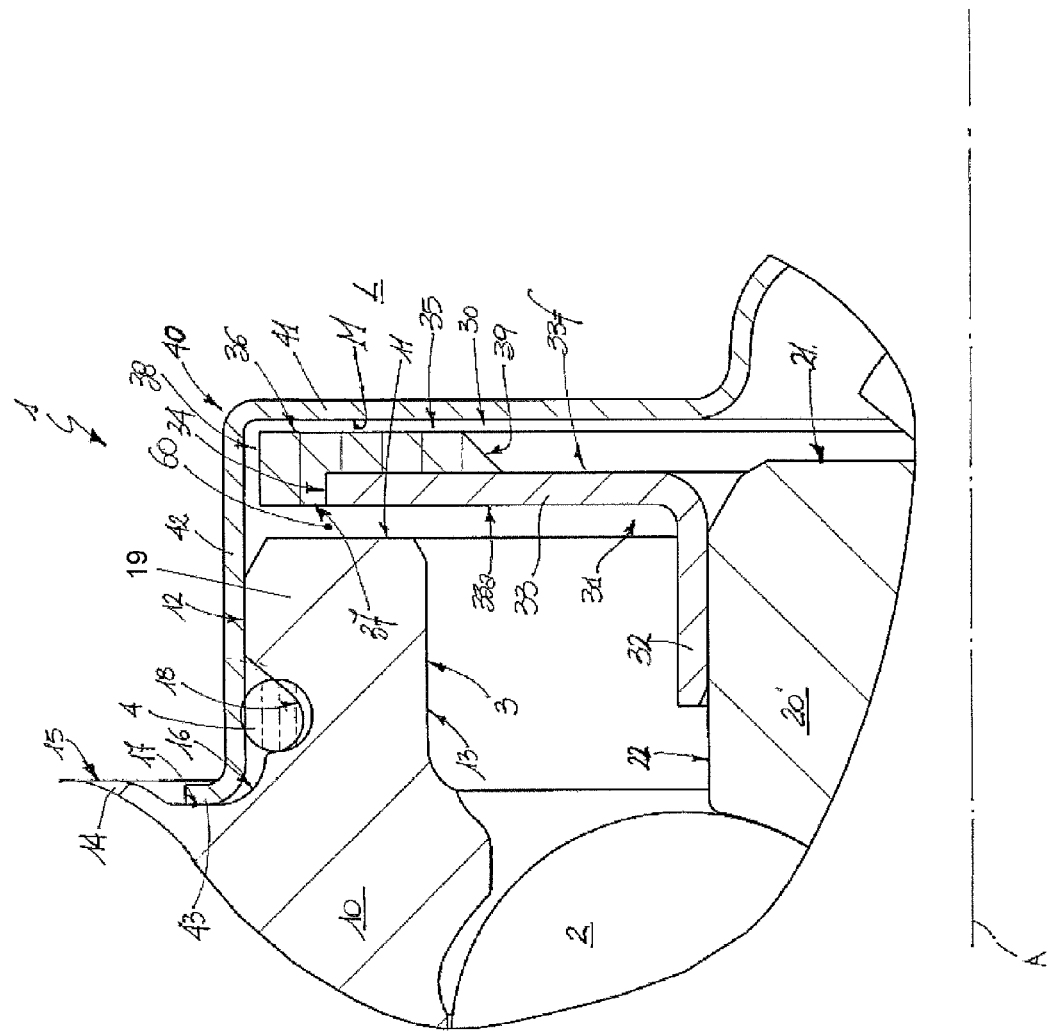

BEARING UNIT FOR A VEHICLE WHEEL

FIELD OF THE INVENTION

The present invention relates to a bearing unit for a vehicle wheel. In particular, the present invention relates to a bearing unit having a radially outer stationary ring, a radially inner rotatable ring, a phonic wheel or magnetic encoder fixed to the inner ring; and a protective cover of non-ferromagnetic material mounted on the outer ring to protect the encoder and to close off a space formed between the two rings.

BACKGROUND OF THE INVENTION

Normally, the encoder is mounted entirely within the space between the two rings, and in this type of known solution the protective cover is usually mounted on the outside of the outer ring and bears axially on the axial surface of the outer ring itself at a very small distance from the encoder, in order to reduce the axial dimensions of a gap between the encoder and the cover which could, if large, reduce the strength of the signal produced by the rotation of the encoder and captured by a sensor which is installed on a stationary part in a position facing the encoder and outside the cover.

The electrical signals generated by the sensor as a result of the rotation of the encoder are transmitted to a processing unit mounted on the vehicle, which provides information on the speed of the wheels.

The geometric limitations imposed on the radial dimensions of the sensor by the size of the space, and the presence of a cover between the encoder and the sensor, reduce the strength of the signal received by the sensor in certain applications.

The object of the present invention is to provide a bearing unit for a vehicle wheel which enables the strength of the signal produced by the rotation of the encoder to be increased without any modification of the mounting configuration of the bearing unit.

SUMMARY OF THE INVENTION

According to the present invention, a bearing unit for a vehicle wheel is provided, having the characteristics defined in the attached claims.

BRIEF DESCRIPTION OF THE FIGURES

The present invention will now be described with reference to FIG. 1 which shows, in axial section, a non-limiting exemplary embodiment of the invention.

DETAILED DESCRIPTION OF THE INVENTION

With reference to FIG. 1, the number 1 indicates the whole of a bearing unit for a wheel (not shown) of a vehicle. The unit 1 has an axis of rotation A and comprises a radially outer stationary ring 10 which can be fixed to a strut (not shown) of the suspension of a vehicle and a radially inner rotatable ring 20 positioned inside the ring 10 so that it can rotate about the axis A and with respect to the ring 10 because of the interposition of a plurality of revolving bodies 2 (only one of which is shown).

The unit 1 further comprises a phonic wheel 30 or magnetic encoder fixed to the inner ring 20 and a protective cover 40 of non-ferromagnetic material mounted on the outer ring 10 to protect the encoder 30 and to close off a space 3 formed between the two rings 10 and 20.

In particular, the outer ring 10 and the inner ring 20 are axially delimited on one side L of the unit 1 by respective axial annular surfaces 11 and 21 which are transverse to the axis of rotation A, of which the surface 11 is placed in a more axially inward position in the unit 1 relative to the surface 21. The outer ring 10 and the inner ring 20 are also radially delimited towards the outside by respective cylindrical surfaces 12 and 22, of which the surface 22, facing an inner cylindrical surface 13 of the outer ring 10, defines the space 3 between itself and the cylindrical surface 13.

The outer ring 10 has a mounting flange 14 (partially illustrated in the attached drawing) for mounting the unit 1 on the aforesaid strut, this flange having an axial surface 15 which is transverse to the axis A and which can be placed so as to bear axially on the aforesaid strut. The outer ring 10 also has a shaped annular channel 16 which is formed at the position of the flange 14 in the cylindrical surface 12 and also in the axial surface 15, this channel having an axial bottom surface 17 parallel to the surface 15 and a cavity 18 placed radially inside the surface 12 to house an annular gasket 4 (shown in its non-deformed configuration in the attached drawing) of the unit 1.

The protective cover 40 is preferably, but not necessarily, made of non-ferromagnetic material and is mounted on the cylindrical surface 12 of the outer ring 10 to protect the encoder 30 and close off the space 3. The cover 40 is cup-shaped with its concavity facing the space 3, and comprises an annular end wall 41 positioned transversely to the axis A in a position parallel to and facing the surfaces 11 and 21, and a cylindrical mounting wall 42 which is coaxial with the axis A, is integral with the annular end wall 41, and is fitted on to the surface 12 so as to isolate at least the cavity 18 from the outside, while also compressing the gasket 4 within the cavity 18.

The cylindrical wall 42 comprises a free edge 43 which is bent radially outwards and is placed within the channel 16 so as to bear axially on the bottom surface 17: since the axial distance between the bottom surface 17 and the surface 15 is greater than the thickness of the edge 43, this edge is placed entirely within the channel 16 and does not interfere with the operations of mounting the unit 1 on the aforesaid strut. In fact, when the unit 1 is coupled to the aforesaid strut, the cylindrical wall 42 is inserted into a cylindrical seat of the strut, and the flange 14 is placed so as to bear axially on the strut in such a way that the surface 15 substantially adheres to the strut. The presence and position of the edge 43 with respect to the aforesaid strut also ensure that the cover 40 is retained in its mounting position.

The unit 1 also has an annular compartment 60 which is radially delimited towards the outside by the wall 42, and is axially delimited towards the outside of the unit 1 by the wall 41 and towards the inside by the surface 11. The compartment 60 is completely isolated from the outside by the cover 40 and contains the encoder 30, which is fixed to the outer cylindrical surface 22 of the inner ring 20 and extends radially from the cylindrical surface 22 to a boundary in the proximity of the wall 42, in other words in the proximity of the cylindrical surface 12.

In particular, the encoder 30 comprises a flanged annular support 31, which is mounted on the cylindrical surface 22 and comprises, in turn, a tubular body 32 fitted on to the surface 22 and an annular flange 33 integral with the body 32 and extending radially from the body 32 towards the outside and towards the wall 42. The flange 33 is delimited, on the side opposite the body 32, by a cylindrical free terminal edge 34 which is substantially positioned so as to be radially equidistant from the surfaces 13 and 12, and facing the surface 11; in other words, it is positioned within the compartment 60.

The encoder 30 further comprises a magnetized annular portion 35 which is integral with the flange 33 and is placed on both the edge 34 and a front surface 33f of the flange 33. The portion 35 is composed of a plurality of magnetic poles with opposing polarity, alternating with each other, and is delimited as follows:

axially, by two faces 36 and 37 transverse to the axis A, and radially, by a transverse cylindrical face 38 bounded by the faces 36 and 37 and turned towards the wall 42, and by a conical face 39, which extends axially outwards from the surface 33f and is turned towards the axis A and towards the wall 41.

The face 36 is contiguous to the faces 38 and 39 and is placed towards the wall 41 of the cover 40, with which it forms an annular gap M having very small axial dimensions, while the face 37 is coplanar with an inner surface 33a of the flange 33, and is placed in an axially intermediate position between the two axial surfaces 11 and 21.

The magnetized annular portion 35 occupies a large part of the compartment 60 and projects both axially from the flange 33 and radially from the flange 33, having an outside diameter greater than an outside diameter of the terminal edge 34.

It is clear from the above description that the presence of the compartment 60 in the unit 1 allows the encoder 30 to extend radially well beyond the geometrical limit which would be imposed by the surface 13 in a conventional bearing unit, in which the encoder is placed entirely within the space 3. Since the encoder 30 can be extended freely until it reaches the maximum permitted diameter defined by the surface 12, it is possible to create an annular portion 35 having larger dimensions than those of the encoders of conventional bearing assemblies.

Further benefits of locating the magnetized annular portion 35 outside the space 3 and inside the compartment 60 can be summarized as follows:

since the number of magnetic poles in the encoder 30 is fixed and invariable in order to permit the correct reading of the signal generated in their rotation about the axis A, the possibility of having a larger annular portion 35 means that the magnetic poles can also be correspondingly larger, leading to a substantial improvement in the signal produced during rotation, and thereby providing better detection capacity;

the mounting of the encoder 30 on the ring 20 can be completely controlled, thus ensuring its correct positioning with respect to the rings 10 and 20 and, especially, with respect to the cover 40.

Furthermore, although it is placed outside the space 3, the encoder 30 is still fully protected from contaminants such as water, dust and debris, owing to the presence of the cover 4.

A further advantage of the preferred embodiment of the unit 1 described above is that the compartment 60 is formed without any substantial external modification of the unit 1, in other words without requiring the end user to change any features of the geometries used by him, such as the geometry of the aforesaid strut. This is because the compartment 60 can be formed, even when starting with a unit 1 in which the two surfaces 11 and 21 are coplanar with each other, simply by reducing the axial length of what is known as the "spigot" of the ring 10, in other words the cylindrical part 19 of the ring 10 which is radially delimited by the surfaces 12 and 13, and on which the cylindrical surface 42 of the cover 40 is mounted.

The invention claimed is:

1. A bearing unit for a vehicle wheel, the bearing unit having an axis of rotation and comprising:
   a radially outer stationary ring which is axially delimited on one side of the bearing unit by a first axial surface in a first plane which is transverse with respect to the axis of rotation;
   a radially inner rotatable ring which is delimited on the one side of the bearing unit by a second axial surface in a second plane which is transverse with respect to the axis of rotation;
   an encoder fixed to an outer cylindrical surface of the inner ring; and
   a protective cover mounted on an outer cylindrical surface of the outer ring to protect the encoder and to extend over an opening into a space between the radially outer ring and the radially inner ring; and wherein
   the first axial surface and the protective cover jointly delimit a compartment for housing the encoder, and
   wherein the encoder comprises a flanged annular support fixed to the outer cylindrical surface of the radially inner ring and a magnetized annular element mounted at a radially outer portion of the flanged annular support, and
   wherein the flanged annular support includes a radially extending annular flange located between the first plane and the second plane and wherein the magnetized annular portion is intersected by the second plane.

2. A bearing unit for a vehicle wheel, the bearing unit having an axis of rotation and comprising:
   a radially outer stationary ring which is axially delimited on one side (L) of the bearing unit by a first axial surface which is transverse with respect to the axis of rotation (A);
   a radially inner rotatable ring;
   an encoder fixed to a first outer cylindrical surface of the inner ring; and
   a protective cover mounted on a second outer cylindrical surface of the outer ring to protect the encoder and to close off a space formed between the outer and inner rings; and wherein
   the first axial surface and the protective cover jointly delimit a compartment for housing the encoder, which is positioned substantially outside the space and extends radially from the first cylindrical surface to a boundary in the proximity of the second cylindrical surface, and
   wherein the outer ring is provided with a mounting flange forming a mounting surface, and with a shaped annular channel formed in the flange either through at least one of the mounting surface and through the second cylindrical surface, the cover having a bent edge positioned axially so as to bear against an axial bottom surface of the shaped annular channel.

3. The bearing unit according to claim 2, wherein the encoder comprises:
   a flanged annular support fixed to the first cylindrical surface, the annular support being radially delimited outwardly by a terminal edge positioned in front of the first axial surface, and
   a magnetized annular portion mounted on the terminal edge and disposed in the compartment, the magnetized annular portion having an outside diameter greater than an outside diameter of the terminal edge.

4. The bearing unit according to claim 2, further comprising an annular gasket positioned in the channel and compressed within the channel by the cover.

5. The bearing unit according to claim 1, wherein the flanged annular support is located entirely on one side of the second plane.

6. A bearing unit for a vehicle wheel, the bearing unit having an axis of rotation and comprising:
- a radially outer ring having a cylindrical inner surface, a cylindrical outer surface, a first axial surface transverse to the axis of rotation and a mounting flange axially spaced from the first axial surface and extending away from the axis of rotation;
- an annular channel in the mounting flange, the annular channel having a channel bottom;
- a radially inner ring mounted in the radially outer ring for rotation relative to the radially outer ring, the radially inner ring having a cylindrical outer surface;
- a protective cover mounted on the cylindrical outer surface of the radially outer ring, the protective cover having a first portion having a first end and a second end, the first portion overlying the cylindrical outer surface of the radially outer ring, and a second portion extending from the first end of the first portion toward the axis of rotation and over a gap between the cylindrical inner surface of the radially outer ring and the cylindrical outer surface of the radially inner ring, and a third portion at the second end of the first portion, the third portion extending into the annular channel, the second portion of the protective cover and the first axial surface defining first and second sides of a compartment, and
- an encoder fixed to the cylindrical outer surface of the radially inner ring and being at least partially disposed in the compartment.

7. The bearing unit according to claim 6, wherein the third portion of the protective cover abuts the channel bottom.

8. The bearing unit according to claim 7, wherein the annular channel in the mounting flange extends into the cylindrical outer surface of the radially outer ring.

9. The bearing unit according to claim 8, further including an annular gasket in the annular channel and compressed within the annular channel by the protective cover.

* * * * *